United States Patent Office 3,496,810
Patented Feb. 24, 1970

3,496,810
HYDROSTATIC TOOLPOST
John Barry Hunt, Bassett, Southampton, England, assignor to National Research Development Corporation, London, England, a corporation of Great Britain
Filed Nov. 6, 1967, Ser. No. 680,783
Int. Cl. B23b 29/00, 39/00; F16c 29/02
U.S. Cl. 82—36                                6 Claims

ABSTRACT OF THE DISCLOSURE

A holder for a passive tool on a machine tool comprising a bar of polygonal cross section housed in a blind cavity of similar cross section, with clearance all around and between the end of the bar and the blind end of the cavity. Hydrostatic bearing pockets are provided in the sides and end of the bar or in the corresponding interior faces of the cavity. At least two such pockets are located one near each end of each of the sides of the bar. Pressurised fluid is supplied to these pockets through individual restrictor orifices so that the bar is supported in the cavity with clearance all around it. Vibrations generated at the cutting point of a tool in the tool holder are damped near their point of origin by the hydrostatic bearings.

---

This invention relates to a toolpost for mounting the cutting tool of a machine tool.

It has been the normal practice to secure an inactive cutting tool by bolting it to a toolpost rigidly secured to a slide or the like of a machine tool. When this is done any vibration generated at the cutting point is transmitted by way of the cutting tool, toolpost, cross slides and the like, to the machine structure and thence to the workpiece by means of a headstock slide, or the like in which the workpiece is mounted. In this way the vibration may be amplified.

It is the object of the invention to damp this vibration at a point as near as possible to its point of generation without sacrificing the accurate location of the tool and its ability to support the cutting loads.

According to the invention there is provided a toolpost comprising an inner bar member which is of polygonal cross section having not less than three flat faces extending along its longitudinal axis, a casing surrounding the bar member at least over the extent of the said flat faces and also over at least one end of the bar member and having inner surfaces parallel to but capable of being uniformly spaced away from the said flat faces and end of the bar member, recesses in either the said flat faces and end of the bar member or in the said inner surfaces of the casing to provide island zones where the clearance beyond the bar member and the casing is increased, at least two such zones being provided, located at positions spaced apart along the length of each of the said flat faces and at least one zone located at the said end, means for introducing fluid under pressure to each of the said zones and means for permitting the escape of such fluid from the clearance space, between the bar member and the casing, surrounding the said zones.

Preferably the said fluid passes through a restrictor orifice housed in the casing in passage to each of the said zones.

Preferably, the end of the bar member remote from the end at which the said zone is located, protrudes from the casing and is provided with means for attaching a cutting tool thereto.

The invention will more readily be understood from the following description of an embodiment thereof illustrated in the accompanying drawings in which.

Figure 1:
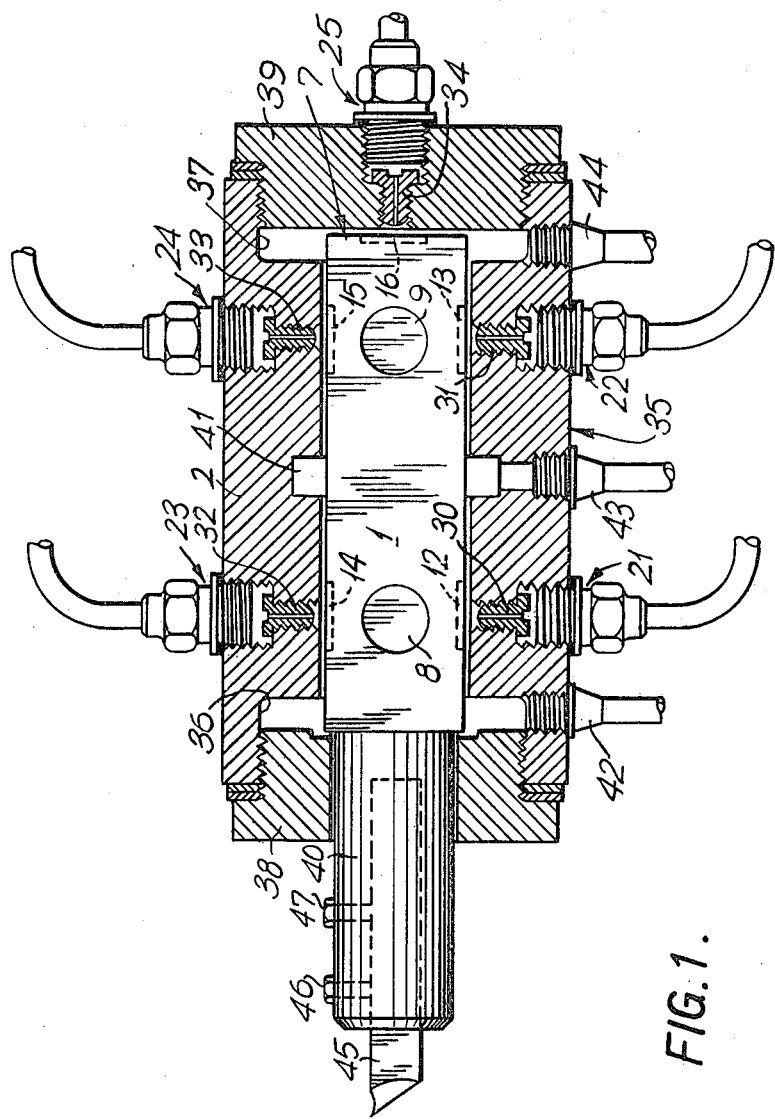
FIG. 1 is a longitudinal section of the said embodiment.
Figure 2:
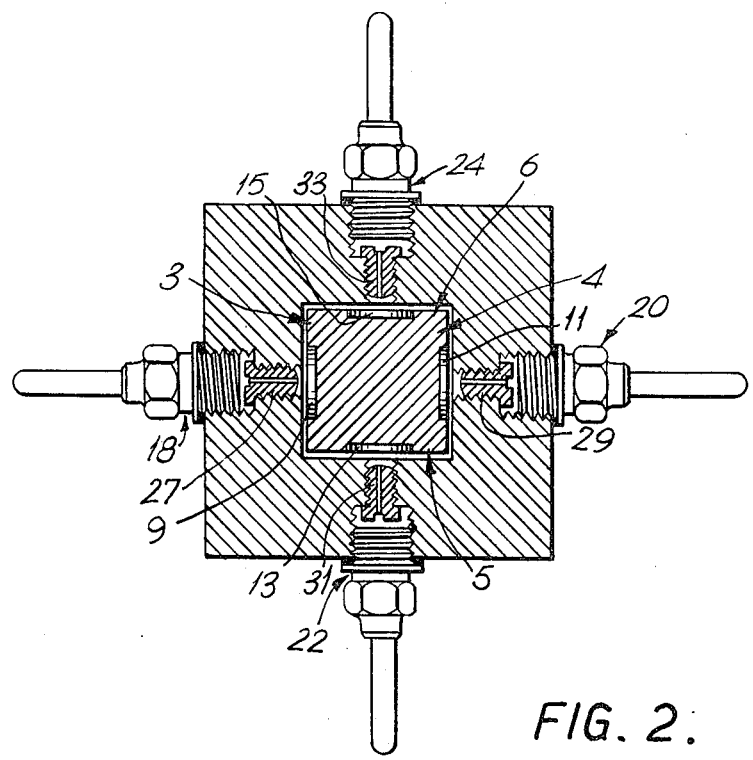
FIG. 2 is a cross section of the said embodiment.

A bar member 1 is of rectangular cross section over the larger part of its length and is housed in a casing 2 which has complementary inner surfaces so as to permit the bar member to be suspended within it with a small clearance. Bar member 1 has four elongated flat faces 3, 4, 5 and 6 and a flat end face 7. Each of the elongated faces 3, 4, 5 and 6 has two shallow recesses spaced apart along its length, namely 8 and 9 for face 3, 10 and 11 for face 4, 12 and 13 for face 5, and 14 and 15 for face 6. End face 7 has a single similar recess 16.

Opposite each of these recesses 8 to 16 the casing 2 is drilled to receive a pipe union, 17 for recess 8, 18 for recess 9, 19 for recess 10, 20 for recess 11, 21 for recess 12, 22 for recess 13, 23 for recess 14, 24 for recess 15, 25 for recess 16. Individual pipes connected to these unions communicate with a manifold (not shown) to which is supplied fluid under pressure.

In the bore leading to each of the recesses 8 to 16 there is a restrictor, these restrictors being designated 26 to 34, for recesses 8 to 16 respectively. These restrictors may conveniently be screws drilled through with calibrated holes and accommodated in tapped holes in casing 2.

Casing 2 consists of a centre 35 of hollow rectangular cross section which is bored out at 36 and 37 to a cylindrical internal form for a short length at its ends and internally screw-threaded to receive end blocks 38 and 39, the former of which is apertured to permit a circular extension 40 of bar member 1 to protrude through it, and the other of which supports union 25 and restrictor 34 and provides a flat end surface opposed to end face 7 of bar member 1.

Fluid supplied to the recesses 8 to 16, through restrictors 26 to 34, builds up pressures in the recesses to support bar member 1 with considerable stiffness within casing 2 and the fluid escapes via the clearance surrounding the recesses, into the cylindrical end bores 36 and 37 and into a central channel 41 cut into the inner surface of casing member 2, whence it is conveyed by drain pipes 42, 43 and 44 respectively to the low pressure side of the pressurised fluid supply source.

Extension 40 of bar member 1 is bored out to receive a tool bit 45, secured by set screws 46 and 47.

Bar member 1 is shown as being of substantially square cross section but it could be of any convenient polygonal cross section, for instance it could have three elongated faces instead of four, as a minimum, with a correspondingly reduced number of recesses and fluid supply points.

As another alternative, bar member 1 still having four elongated faces, two opposite faces could be wide enough to accommodate two side-by-side paris of recesses, with correspondingly duplicated fluid supply points. This might be required where the cutting tool was subjected to a substantial torque (e.g. a boring bar).

Any number of elongated faces could be provided on bar member 1 but as each requires the provision of corresponding fluid supply points the number of faces should be reduced to a minimum consistent with adequate support and in any event not less than three.

In the illustrated embodiment the recessess 8 to 16 are machined in the faces 3 to 7 of bar member 1 for ease of manufacture but these faces could be left plain and the recesses machined in corresponding positions in the inner surfaces of casing 2.

It would be possible likewise to ease manufacture by cutting the channel 41 in the faces of bar member 1 rather than in the inner surfaces of casing 2 but this was not done in the illustrated embodiment lest it might weaken bar member.

By suitable proportioning of the recesses 8 to 16, the restrictors 26 to 34, and the clearance between the bar member 1 and the casing member 2 around the said recesses, it is possible to provide extremely accurate and unyielding support for the tool bit 45 provided that a fluid supply pressure commensurate with the loads applied to tool bit 45, is available. Nevertheless there is a high damping or absorption of vibrational energy generated at the cutting point and in particular the toolpost according to the invention acts as a break in the regenerative path, which commonly exists via the slides etc. on which the tool is supported, the machine bed, and the further components intervening between the machine bed and the workpiece.

The design of the recesses 8 to 16, the restrictors 26 to 34 and the clearance surrounding the recesses and the choice of fluid pressure supplied thereto follow well-established principles in use for hydrostactic bearings where one body is supported for movement relative to another. By the same token, other configurations of so-called "pressure pad" known in the hydrostatic bearing art may be used in carrying out the present invention instead of the recesses and restrictors of the illustrated embodiment.

The illustrated embodiment is intended for use with a cutting tool in a lathe but a similar design might be used for a planning machine for instance.

I claim:

1. A toolpost for supporting an inactive tool in a machine tool comprising an elongated bar-like body of polygonal cross section supported and secured against motion in a casing body within which it is accommodated with clearance, by means of hydrostratic bearings, one of such bodies being adapted to have secured thereto an inactive tool bit and the other body being adapted to be secured to a part of the machine tool.

2. A toolpost comprising an inner bar member of polygonal cross section having not less than three flat faces extending along its longitudinal axis, a casing surrounding the bar member at least over the extent of the said flat faces and also over at least one end of the bar member and having inner surfaces parallel to but capable of being uniformly spaced away from the said flat faces and the end of the bar member, recesses in either the said flat faces and end of the bar member or in the said inner surfaces of the casing to provide island zones where the clearance between the bar member and the casing is increased, at least two such zones being provided, located at positions spaced apart along the length of each of the said flat faces and at least one zone located at the said end, means for introducing fluid under pressure to each of the said zones and means for permitting the escape of such fluid from the clearance space between the bar member and the casing, surrounding the said zones.

3. A toolpost as claimed in claim 2 in which a restrictor orifice lies in the path of fluid flow to each of the said zones.

4. A toolpost as claimed in claim 2 in which the bar member has an extension at the end remote from the end at which the said zone is located, which extension protrudes through the end of the casing and is provided with means for attaching a cutting tool thereto.

5. A toolpost as claimed in claim 2 in which the ends of the casing are machined to a larger inner cross-sectional area than that of the central portion surrounding the said flat faces of the bar member over a short section of the length of the casing at each end with ducts leading from such short sections adapted for connection to a point of low pressure in a pressurised fluid supply system.

6. A toolpost as claimed in claim 5 in which a circumferential groove is formed in the inner surface of the said central portion of the casing at a position between the two zones on each of the said faces of the bar member and a duct leading from such groove adapted for connection to the said point of low pressure.

References Cited

UNITED STATES PATENTS

| | | | |
|---|---|---|---|
| 3,030,744 | 4/1962 | Mueller | 51—225 |
| 3,263,530 | 8/1966 | Pleger et al. | 77—1 |

LEONIDAS VLACHOS, Primary Examiner

U.S. Cl. X. R.

77—1; 82—37; 308—1